United States Patent [19]

Schlapp et al.

[11] 4,181,419

[45] Jan. 1, 1980

[54] INTERCHANGEABLE LENS FOR SLR-CAMERAS HAVING TTL LIGHT METERING

[75] Inventors: Werner Schlapp, Asslar; Willi Wiessner, Wetzlar, both of Fed. Rep. of Germany

[73] Assignee: Ernst Leitz Wetzlar GmbH, Wetzlar, Fed. Rep. of Germany

[21] Appl. No.: 850,011

[22] Filed: Nov. 9, 1977

[30] Foreign Application Priority Data

Nov. 10, 1976 [DE] Fed. Rep. of Germany ....... 2651263

[51] Int. Cl.² ............................................ G03B 17/18
[52] U.S. Cl. .................................... 354/286; 354/289
[58] Field of Search ................. 354/273, 286, 289, 40, 354/45, 46, 270, 272, 274

[56] References Cited

FOREIGN PATENT DOCUMENTS 2705187  9/1977  Fed. Rep. of Germany ........... 354/289

Primary Examiner—Michael L. Gellner
Attorney, Agent, or Firm—Schwartz, Jeffery, Schwaab, Mack, Blumenthal & Koch

[57] ABSTRACT

In an interchangeable lens assembly for single lens reflex cameras the f-stop preselection ring is provided with a first transmission element for transmitting the preselected f-stop value into the light metering instrument of the camera housing, and with a second transmission element for controlling a device in the camera housing which indicates the preselected f-stop value. Said first and second transmission elements are parts of one common setting member which is in such a manner fixedly mounted on the preselection ring that — when the preselection ring is in its base position — said first transmission element assumes the same position in all interchangeable lenses while said second transmission element assumes positions that vary according to the maximum opening of the lens.

3 Claims, 3 Drawing Figures

INTERCHANGEABLE LENS FOR SLR-CAMERAS HAVING TTL LIGHT METERING

BACKGROUND OF THE INVENTION

1. Field of the Invention

The present invention relates to single lens reflex cameras with TTL metering and having interchangeable lenses of different maximum opening. More particularly the invention relates to transmission elements connected to the preselection ring of the interchangeable lenses which transmission elements control both the light metering instrument of the camera and the f-stop indicating means in the camera housing.

2. Description of the Prior Art

In connection with SLR cameras there are interchangeable lenses known which comprise an f-stop preselection ring. A first transmission means is connected to the ring such that when employing f-stop preselection, through a particular motion of the preselection ring in an arcuate movement about the optical axis of the lens, a control value is transmitted to a follow-up pointer which is coaxially arranged to the needle of the measuring instrument of the light metering circuit in the camera housing. Rotation of the preselection ring is employed until the position of the follow-up pointer coincides with the instrument needle.

On the other hand, it is also known to fixedly join the f-stop preselection ring with a second, separately arranged transmission means which serves to actuate in the camera housing an indicating means that indicates the f-stop value which has been preselected so that the user of the camera may read the preselected f-stop value off said indicating means.

It is, however, a disadvantage that in the prior art lenses said first and second transmission means are separate members. Specifically it is inconvenient to produce and to assemble two separate parts which are both mounted on the preselection ring. This leads to difficulties not only during production but also with respect to storage, in particular spare parts storage.

SUMMARY OF THE INVENTION

It is, therefore, an object of the present invention to overcome the above stated disadvantages. Particularly the invention has as its object to provide for SLR cameras with TTL metering and indicating means of the preselected f-stop value an interchangeable lens assembly of which the preselection ring may be mounted and assembled in a simple manner.

According to the invention these objects are attained with a lens assembly which comprises amongst other elements a lens arrangement, a rotatable f-stop preselection ring, and only one setting member attached to said preselection ring. The setting member is provided with a first transmission means and a second transmission means which are capable of communicating the setting of said f-stop preselection ring to the light metering instrument and to the indicating means of the camera.

In accordance with the present invention it is therefore possible to use only a single element as the activation means which comprises the first and the second transmission means. Thus, only a single part needs to be produced and installed as a single component part and only this part needs to be assembled and stored.

On the completely assembled objective, the position, on all objectives, of the first transmission means has the same location while the position of the second transmission means is varied depending on the largest relative opening of the interchangeable lens that is used.

The first and second transmission means may be in the form of stubs, pins, prongs, or similar contact means. Particularly advantageous is the configuration wherein the element is formed as a curved element (which is curved along the curvature of the inside diameter of the f-stop preselector ring) and has located thereon, in the direction directed towards the camera housing, steps or protrusions, which form the first and second transmission means.

In the description that follows below, the utilization of the second transmission element is described with reference to the indication of a preselected f-stop value within the camera. This purpose is to be understood as being only examplary. The second transmission means, i.e., the transmission means whose position is varied as a function of the rating of the objective employed, can be used to transmit information to a camera having exposure time preselection in combination with automatic f-stop setting to indicate the smallest possible f-stop value. Further, for lenses which are operated with working apertures instead of f-stop preselection the second transmission means can be used to control this working aperture.

BRIEF DESCRIPTION OF THE DRAWINGS

FIG. 1b shows in perspective a lens assembly, comprising the elements of the present invention, for use in the camera shown in FIG. 1a.

DESCRIPTION OF THE PREFERRED EMBODIMENTS

Figure 1A:
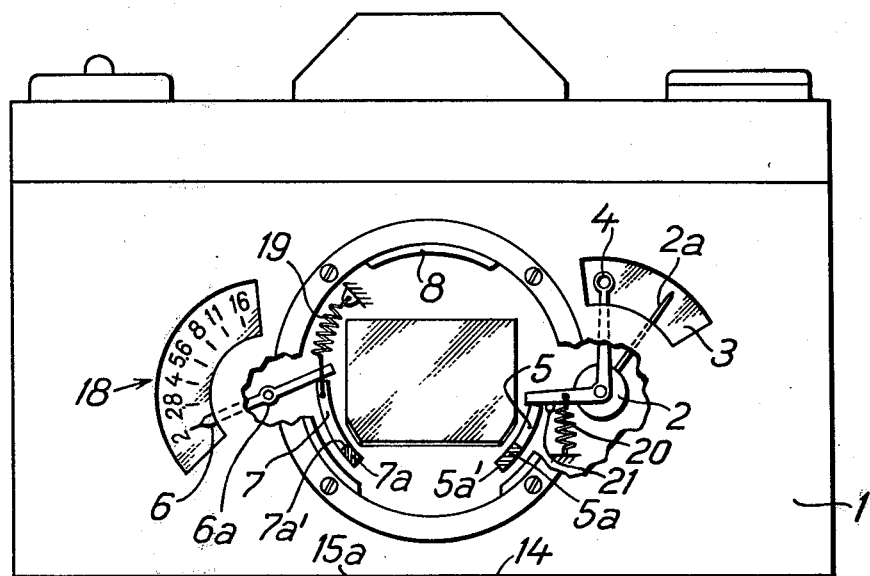
FIG. 1a is an elevational view of a reflex camera with some of the parts shown in cross-section.

Camera housing 1 (FIG. 1a) of a reflex camera, comprising the usual features of such a camera such as, for example, interchangeable lens with varying openings and having diaphragm or f-stop preselection and a through-the-lens (TTL) light meter. Particularly, the camera is furnished with a light metering system of which only the measuring instrument 2 is shown. The light meter is coupled as is known in the art, with the selector means for setting of the exposure time, as for example disclosed in U.S. Pat. Nos. 3,427,946 and 3,603,234. The measuring instrument 2 comprises an indicator needle 2a which can be observed through window 3.

A bell crank-type lever, the upper arm of which forms a follow-up pointer 4, is mounted coaxially with the indicator needle 2a but individually pivotable. The horizontal arm (FIG. 1a) of the bell crank lever is actuated by a sliding member 5 which sliding member, not shown in complete detail, is rotatably arranged about the optical axis of the mounted lens assembly. The sliding member comprises near its terminating end a contact protrusion 5a having a frontal face 5a'.

An f-stop indicator in the form of a lever 6 is further provided. The lever is mounted rotatably about a center 6a. The lower end of lever arm 6 is actuated by a second sliding member 7 which, like the sliding member 5, is mounted rotatably about the optical axis of the lens system and also comprises a contact protrusion 7a with a contact face 7a'.

Figure 1B:
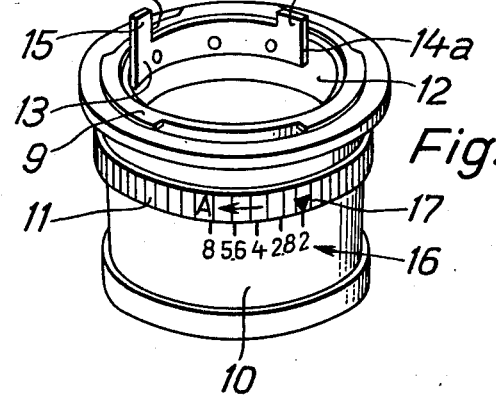

The camera housing 1 is adapted to receive interchangeable lens assemblies, one of which is illustrated in FIG. 1b and designated by the number 10. The relation of the lens 10 and the camera has been illustrated in FIGS. 1a and 1b so as to indicate that the lens is to be tilted by about 90° and inserted into the camera. The camera housing has bayonet-coupling segments 8 which cooperate with corresponding bayonet segments 9 on the lens assembly 10 to firmly secure the lens assembly 10 to the camera housing.

The lens or objective assembly 10 comprises a rotating f-stop preselection ring 11 which serves, as is known, to select the preliminary or working aperture or f-stop setting. Within the lens assembly 10 an inner ring 12 is fixedly attached to the f-stop selection ring 11. Thus, as the ring 11 is rotated, the inner ring is rotated or turned as well. The inner ring 12 carries the setting member 13 shown in various positions in FIG. 2 and in perspective in FIG. 1b.

Setting member 13 is generally U-shaped and curved with the inner diameter of ring 12. It comprises two transmission means in the form of bar sections 14 and 15, respectively, as can best be seen in FIG. 2. The bar section 14 has an abutting face 14a, while the bar section 15 has an abutting face 15a. In mounted position, the bar section 14 cooperates with the sliding member 5 by means of its abutting face 14a while the second bar section 15, through its abutting face 15a, cooperates with the sliding member 7 associated with the f-stop indicator.

The assembly and operation of the system will now be described.

When mounting the lens assembly 10 (and giving it the quarter turn normally required to secure the assembly), the first bar section 14 engages by way of its abutting face 14a with the face 5a' of the sliding member 5 while the other bar section 15 engages with the contact face 7a' of sliding member 7 by way of its abuting face 15a.

By means of a spring 20 the follow-up pointer 4 is pulled against a pin 21 into a starting position when no lens is mounted on the camera housing. Thereby the sliding member 5 is also pushed into a starting position against the force of a spring (not shown) so that the face 5a' assumes a base position.

On the other hand, in the lens assembly the setting member 13 is in all interchangeable lenses which fit into the camera housing mounted in such a manner that the abutting face 14a of the bar section 14 assumes a position wherein said face just abuts against the face 5a' of the sliding member 5 when the lens assembly is mounted on the camera housing and the preselection ring is in its base position. In this base position the index 17 is always positioned opposite to the largest aperture opening of the particular interchangeable objective, as shown in FIG. 1b. Thus, the base position of the follower needle 4 is the f-stop value of the just inserted interchangeable lens. This camera setting is known with respect to the light metering systems and is, for example, disclosed in U.S. Pat. Nos. 3,427,946 and 3,603,234.

The second bar section serves to actuate the f-stop indicator mechanism by means of lever 6 with respect to an indicating scale 18. Upon rotation of ring 11 in the direction of arrow A (counter-clockwise, see FIG. 1b), the actuating bar 15 rotates the sliding member 7 by engagement with the face portion 7a' in counter-clockwise direction against the force of compression spring 19. The motion of sliding element 7 is followed by indicator lever 6 under the pressure of a spring, not shown. Thus lever 6 indicates the f-stop value selected with the ring 11 on a display means such as the scale 18. Actually, when setting the camera, the preselection ring will be rotated until the follow-up pointer 4 coincides in position with the needle 2a of the measuring instrument 2 and the user of the camera will then have to look at the scale 18 in order to read what f-stop value the camera is set to.

In order that the display means is properly synchronized, lever 6 is always set to the maximum f-stop value of the particular lens assembly that is used when the interchangeable lens is mounted and with the selection ring 11 in base position. Consequently, the starting position of lever 6 is not always the same position but is moved more or less depending on the opening of the objective.

Figure 2:
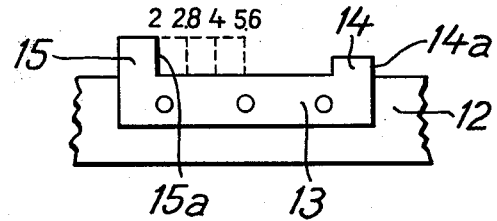
FIG. 2 is a planar view of an embodiment of the present invention in several positions.

In order to achieve such different starting position of lever 6 the position of the face portion 15a is varied in accordance with the maximum f-stop value of the particular lens, as is indicated in FIG. 2. In the positions indicated in the FIGS. 1b and 2 a maximum f-stop value of the 1:2 has been assumed for the objective. The face 15a is therefore at its relative extreme (or to the left as indicated in FIG. 2 in solid lines). This position, therefore, represents the base position of the camera assembly shown. When the maximum f-stop value of the lens is 1:4 a setting member 13 is fixedly secured to the inner ring 12 during lens assembly which setting member has the face 15a in a more central position, i.e. it has the face in a position two steps toward the right in FIG. 2. Thus, it is to be understood that each individual lens assembly has its individual setting member. Said setting members are all alike with regard to their outer form and dimension but differ from one another with regard to the position of face 15a. This position of the face 15a is a function of the maximum opening of the lens assembly wherein such setting member is mounted.

When mounting an interchangeable lens with such a lower maximum opening or f-stop value, the sliding member 7 is moved through a corresponding arc and displaces the lever 6 such that the lever 6 correctly indicates the value "4" in window 18. This becomes the base position of the objective having f-stop of 1:4 from which base, upon further rotation of the ring 11 in the direction of arrow A, other selected f-stop values would be shown in window 18.

As can be clearly seen from FIGS. 1b and 2, the transmission means as represented by the bar sections 14 and 15, which to date needed to be attached independently of each other to the selection ring 11 are now attached as a single piece and in a single operation.

The invention has been described with respect to particular cameras and lens assemblies. It should be noted however, that the invention is not restricted to only the specific photographic equipment used and that the invention should be construed as being limited only by the scope of the claims.

We claim:

1. A lens assembly adapted for use as an interchangeable lens on a camera housing which includes TTL light metering on open aperture and means for indicating the preselected f-stop value, said lens assembly comprising:
   a lens arrangement;
   a rotatable f-stop preselection ring for selecting the f-stop value;

a setting member fixedly secured to said preselection ring for simultaneously transmitting and indicating the preselected f-stop value;

a first transmission means in connection with said setting member for transmitting the preselected f-stop value into the light metering means of the camera, said first transmission means assuming a constant position relative to the lens mount in all interchangeable lenses when said preselection ring is in its base position; and a second transmission means in connection with said setting member for controlling means in the camera housing which indicate the preselected f-stop value, said second transmission means assuming a position that varies from interchangeable lens to interchangeable lens in accordance with the maximum f-stop value of the lens assembly, when said preselection ring is in its base position.

2. The lens assembly as described by claim 1, wherein said transmission means comprise two protrusions attached to said setting member.

3. The lens assembly as described by claim 2, wherein said protrusions are prongs.

* * * * *

REEXAMINATION CERTIFICATE (483rd)

United States Patent [19]
[11] B1 4,181,419

Schlapp et al.
[45] Certificate Issued    Apr. 8, 1986

[54] INTERCHANGEABLE LENS FOR SLR-CAMERAS HAVING TTL LIGHT METERING

[75] Inventors: Werner Schlapp, Asslar; Willi Wiessner, Wetzlar, both of Fed. Rep. of Germany

[73] Assignee: Ernst Leitz Wetzlar GmbH, Wetzlar, Fed. Rep. of Germany

Reexamination Request:
No. 90/000,757, Apr. 12, 1985

Reexamination Certificate for:
Patent No.: 4,181,419
Issued: Jan. 1, 1980
Appl. No.: 850,011
Filed: Nov. 9, 1977

[30] Foreign Application Priority Data

Nov. 10, 1976 [DE] Fed. Rep. of Germany ....... 2651263

[51] Int. Cl.[4] ............................................. G03B 17/18
[52] U.S. Cl. ................................. 354/286; 354/289.1
[58] Field of Search ............... 354/270, 272, 273, 274, 354/286, 289.11, 455

[56] References Cited

U.S. PATENT DOCUMENTS

| | | |
|---|---|---|
| 3,082,672 | 3/1963 | Swarofsky et al. |
| 3,427,946 | 2/1969 | Broschke et al. |
| 3,598,036 | 8/1971 | Suzuki ..................... 354/455 |
| 3,603,234 | 9/1971 | Strehle et al. |
| 3,683,765 | 8/1972 | Iura ........................ 354/455 |
| 3,896,462 | 7/1975 | Taguchi et al. ........... 354/455 |
| 4,118,726 | 10/1978 | Kuramoto et al. |

FOREIGN PATENT DOCUMENTS

| | | |
|---|---|---|
| 1124341 | 5/1966 | Fed. Rep. of Germany . |
| 1266636 | 4/1968 | Fed. Rep. of Germany . |
| 1282442 | 6/1969 | Fed. Rep. of Germany . |
| 1772018 | 7/1970 | Fed. Rep. of Germany . |
| 1772797 | 7/1971 | Fed. Rep. of Germany . |
| 2356362 | 5/1974 | Fed. Rep. of Germany . |
| 2705187 | 9/1977 | Fed. Rep. of Germany . |
| 0024863 | 10/1968 | Japan . |
| 0025552 | 8/1972 | Japan . |

OTHER PUBLICATIONS

Minolta Information, No. 1 (1967) p. 2.
Minolta SR-T 101 Camera Operating Instructions, pp. 15, 16 and 19 (1969).

*Primary Examiner*—Russell E. Adams

[57] ABSTRACT

In an interchangeable lens assembly for single lens reflex cameras the f-stop preselection ring is provided with a first transmission element for transmitting the preselected f-stop value into the light metering instrument of the camera housing, and with a second transmission element for controlling a device in the camera housing which indicates the preselected f-stop value. Said first and second transmission elements are parts of one common setting member which is in such a manner fixedly mounted on the preselection ring—when the preselection ring is in its base position—said first transmission element assumes the same position in all interchangeable lenses while said second transmission element assumes positions that vary according to the maximum opening of the lens.

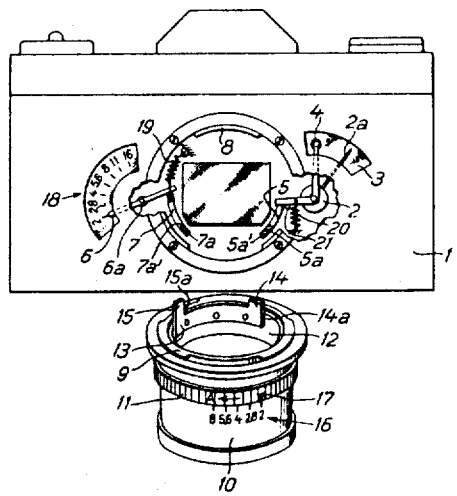

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1 and 3 are determined to be patentable as amended.

New claim 4 is added and determined to be patentable.

1. A lens assembly adapted for use as an interchangeable lens on a camera housing which includes TTL light metering on open aperture and means for indicating the preselected f-stop value, *said light metering and indicator means being separately controllable,* said lens assembly comprising:

a lens arrangement;

a rotatable f-stop preselection ring for selecting the f-stop value;

a setting member *comprising a ring segment* fixedly secured to said preselection ring for simultaneously transmitting and indicating the preselected f-stop value;

a first [transmission means in connection with] *integral, axially protruding portion on* said setting member *having a first abutting face on a side thereof extending parallel to the optical axis of the lens* for *separately* transmitting the preselected f-stop value into the light metering means of the camera, said first [transmission means] *integral protruding portion with said first abutting face* assuming a constant position relative to the lens mount in all interchangeable lenses when said preselection ring is in its base position; and a second [transmission means in connection with] *integral, axially protruding portion on* said setting member *having a second abutting face on a side thereof extending parallel to the optical axis of the lens* for *separately* controlling *indicator* means in the camera housing which indicates the preselected f-stop value, said second [tramsmission means] *integral protruding portion with said second abutting face* assuming a position that varies from interchangeable lens to interchangeable lens in accordance with maximum [f-stop value] *lens opening* of the lens assembly[,] when said preselection ring is in its base position;

*said f-stop value transmitting first abutting face and said indicator controlling second abutting face each moving through an arcuate path around the optical axis of said lens when said preselection ring is rotated to select the f-stop value.*

3. The lens as described by claim [2] *1*, wherein said [protrusions] *first and second integral protruding portions* are prongs.

4. *The lens assembly as described by claim 1, wherein said setting member ring segment is fixedly secured to the inner surface of said preselection ring.*

* * * * *